Dec. 13, 1955     T. C. DONAHUE     2,726,698
EMERGENCY ICE GRIPS
Filed June 17, 1953
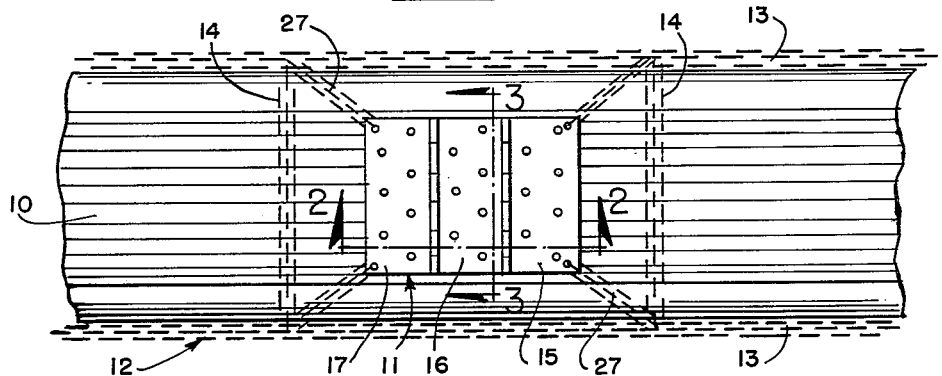
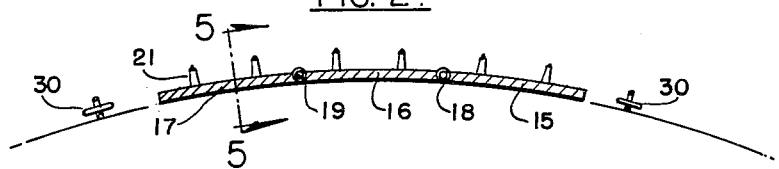
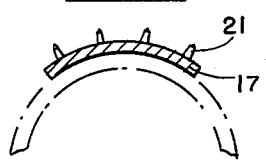
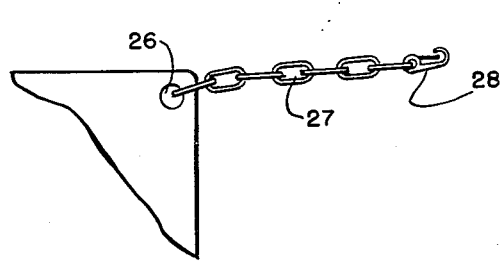
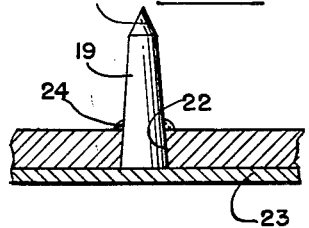
*INVENTOR*
THOMAS C. DONAHUE

United States Patent Office 2,726,698
Patented Dec. 13, 1955

2,726,698

EMERGENCY ICE GRIPS

Thomas C. Donahue, Du Bois, Pa.

Application June 17, 1953, Serial No. 362,282

1 Claim. (Cl. 152—226)

This invention relates to an emergency ice grip.

It is an object of the present invention to provide an ice grip which can be applied to a set of regular automobile chains and can be fitted between the cross chains and which is in the form of a spiked hinged plate.

It is another object of the invention to provide an emergency ice grip which can be connected to the regular chains of the automobile by a simple connecting together of snap chains in the corners of the plate to the sides of the automobile chains adjacent to the cross chains, and wherein when conditions are such that the plates can be removed, the same can be readily and easily unsnapped from the corners of the space between the cross chains of the regular chain.

It is another object of the invention to provide an emergency ice grip formed of hingeable parts so that the same can conform to the contour of the tire surface.

Other objects of the invention are to provide an emergency ice grip which has the objects above in mind, and which is of simple construction, inexpensive to manufacture, has a minimum number of parts, compact, durable, easy to store in the automobile when not in use, self-cleaning, flexible, and efficient in use.

For a better understanding of the invention reference may be had to the following detailed description taken in connection with the accompanying drawing, in which:

Figure 1 is a top plan view of the emergency ice grip connected to the sides of an automobile chain between the cross chains and of the surface of a tire to which the chains are attached;

Fig. 2 is an enlarged sectional view taken generally on line 2—2 of Fig. 1;

Fig. 3 is a transverse sectional view taken generally on line 3—3 of Fig. 1;

Fig. 4 is an enlarged corner fragment of the hinge plate sections with the snap chain attached thereto;

Fig. 5 is an enlarged sectional and fragmentary view taken generally on line 5—5 of Fig. 2 and showing the construction of the hinged plate and more particularly the structure surrounding one of the pin projections.

Referring now to the figures, 10 represents the surface of an automobile tire to which the emergency ice grip indicated at 11 is to be attached by means of a regular automobile chain 12 that usually surrounds the tire and which has side links 13 disposed on the opposite sides of the tire and connected by cross chains 14 spaced over the surface 10 of the tire. Between these cross chains there is to be disposed the hinged emergency grip embodying the features of the present invention. This grip 11 comprises hinged plate sections 15, 16 and 17 hinged together by hinge connections 18 and 19. Each plate section has pins or prongs projecting outwardly from the same. These pins are pointed or tapered at their ends as indicated at 21. The pins are preferably fitted into tapered openings 22 as shown in Fig. 5 that extend inwardly from the back of the plate section and are held in place by a bottom retaining plate 23. A weld 24 surrounds the pin to further fix the same to an upper hinge plate at the upper surface of the same and surrounding the tapered opening 22.

With the plates hinged together the grip can conform to the contour of the surface 10 of the tire. In the end plates 15 and 17 and at the corners thereof are openings 26 respectively to which short corner chains 27 are attached. Each of these chains has a snap hook 28 which can be fastened into the chain links adjacent the ends of the cross chains in the manner as shown in Fig. 1, and as indicated at 30 in Fig. 2. In this manner the emergency grip will be stretched across the space between the cross chains and will conform to the surface of the tire.

Also, the plate sections 15 and 16 and 17 have a transverse curvature as viewed in Fig. 3 to conform generally to the transverse rounded shape of the tire.

It will be apparent that there has been provided an emergency tire grip which can be attached to the regular automobile chains and which is so shaped and arranged to fit tightly the surface of the tire and in a manner so as not to damage the same.

While various changes may be made in the detail construction, it shall be understood that such changes shall be within the spirit and scope of the present invention as defined by the appended claim.

What is claimed is:

An emergency grip plate for attachment to an automobile chain having side and cross chain portions, said grip plate being of a dimension to be disposed between the cross chains of the automobile chain and to be against the tire, corner chains connected to the ends of said plate, said corner chains being extended to the side chains adjacent the connection of the cross chains therewith, said grip plate comprising a plurality of hinged sections, hingedly connected together and curved to conform to the longitudinal and transverse curvatures of the automobile tire, said corner chains having snap hooks thereon for the quick attachment and release of the corner chains to the automobile tire chains, said grip plate having pin projections extending outwardly therefrom, and each hinged section comprising a plate member having tapered openings therein narrowing from the rear face of the plate toward the front face, back retaining plate means associated with the plate member to hold the pins, lying in the tapered openings against rearward displacement and weld means surrounding pins engaging with the top surface of the plate to further retain the pins in place thereupon.

References Cited in the file of this patent

UNITED STATES PATENTS

| | | |
|---|---|---|
| 1,259,190 | Woodworth | Mar. 12, 1918 |
| 1,278,058 | Summerfield | Sept. 3, 1918 |
| 1,307,445 | Kelly | June 24, 1919 |
| 1,500,875 | Jolin | July 8, 1924 |
| 1,523,938 | English | Jan. 20, 1925 |
| 1,567,275 | Klein | Dec. 29, 1925 |
| 1,626,788 | Crawford | May 3, 1927 |
| 2,422,023 | Kropp | June 10, 1947 |